United States Patent [19]
Wu et al.

[11] Patent Number: 5,903,451
[45] Date of Patent: May 11, 1999

[54] SMPS WITH A VARIABLE FREQUENCY START UP CIRCUIT

[75] Inventors: Chun-Hsing Wu; Kian Meng Koh, both of Singapore, Singapore

[73] Assignee: Thomson multimedia S.A., Boulogne, France

[21] Appl. No.: 08/977,515

[22] Filed: Nov. 24, 1997

[51] Int. Cl.⁶ .................................................. H02M 3/00
[52] U.S. Cl. .................................................. 363/49
[58] Field of Search .............................. 363/20, 21, 49, 363/97, 131; 315/387, 405, 406, 141, 209 R

[56] References Cited

U.S. PATENT DOCUMENTS

| | | | |
|---|---|---|---|
| 3,936,115 | 2/1976 | Dietz | 315/399 |
| 4,429,259 | 1/1984 | Luz | 315/408 |
| 4,734,771 | 3/1988 | Lendaro et al. | 358/190 |
| 5,291,386 | 3/1994 | Wu | 363/21 |

FOREIGN PATENT DOCUMENTS

| | | | |
|---|---|---|---|
| 0223171 | 5/1987 | European Pat. Off. | H04N 5/63 |
| 2230114 | 10/1990 | United Kingdom | H02M 3/335 |

*Primary Examiner*—Matthew Nguyen
*Attorney, Agent, or Firm*—Joseph S. Tripoli; Joseph J. Laks; Sammy S. Henig

[57] ABSTRACT

The invention relates to a switch mode power supply (SMPS) comprising control means (IP1) including an oscillator (OS) for generating a pulse-width modulated signal (V2). The object is to provide a fast start-up time over a wide mains input-voltage range (AC). According to the invention, the switch mode power supply comprises a network (T2, R52, R51, R24) which provides in case of a high input voltage a soft start with a low oscillating frequency and in case of low input voltage a start-up with essentially the normal oscillating frequency. The invention provides a fast start-up time over a wide mains input voltage range of 90 Volt up to 265 Volt. The network includes a transistor (T2) used in inverse mode as a switching element which provides a threshold value of about 150 Volt. The power supply can be used advantageously as part of a TV receiver.

6 Claims, 3 Drawing Sheets

… …

SMPS WITH A VARIABLE FREQUENCY START UP CIRCUIT

FIELD OF THE INVENTION

The invention relates to a switch mode power supply (SMPS) comprising control means which include an oscillator for generating a pulse width modulated signal.

BACKGROUND OF THE INVENTION

A known circuit of this type, used in Thomson Chassis TX 91 (Asia), Is shown In FIG. 1. A mains supply voltage source is coupled to a full wave bridge rectifier DP1 for producing a rectified voltage V1 which is smoothed by capacitor C7. The SMPS includes further a transformer LP3 with a primary winding W1, a feedback winding W2 and secondary windings W3 and W4. The voltage V1 is connected in series to the primary winding W1 and to a switching transistor T1.

Control means IP1 including an oscillator OS for generating a pulse-width modulated signal provide a driver voltage V2 at the output 14 for driving the switching transistor T1. The oscillating frequency of the oscillator OS can be adjusted by a resistor R13 and a capacitor C26. As control means IP1 an integrated circuit, e.g. TEA 2261 can be used as described in SGS-Thomson Microelectronics Catalogue 1994, pages 1/9–9/9.

The control means IP1 provide a soft start for a safe start-up after switching on the line power. This is accomplished via a resistor R5 charging slowly a capacitor C14 with a high capacitance which provides the necessary power for the integrated circuit IP1 at pins 15 and 16.

Additionally the SMPS starts with a low oscillating frequency to avoid a current build-up in the switching transistor T1. A current build-up can arise when the energy stored in the primary inductance is not fully transferred to the secondary side before a new conduction period is initiated. This will lead to operation in continuous mode and the switching transistor T1 may leave therefore his safe operating area. To reduce the oscillating frequency during start-up, the SMPS includes a resistor R511 and a diode D9 in series which connect the capacitor C26 with a capacitor C12 which is charged by the feed-back winding W2. The capacitor C12 is not charged up initially when the SMPS is switched on. Therefore, the diode D9 disconnects capacitor C26 from capacitor C12. The operating frequency is then fixed by R13 and C26, which is a low frequency (a few kHz). After a certain time capacitor C12 is charged up and then D9 will be conducting and an additional current will charge C26 via R511, thus the oscillating frequency increases to its normal operating frequency (about 22 kHz). This ensures that the SMPS starts safely in discontinuous mode, i.e. the energy stored in the primary inductance is always fully transferred to the secondary side before a new conduction period of transistor T1 is initiated.

The start-up of this known SMPS is depending on the charge-up time of capacitor C14 via resistor R5, therefore, depending on the voltage value of the AC mains input voltage. This leads to a quite long start-up time at a low mains input voltage.

SUMMARY OF THE INVENTION

It is the object of the invention to provide a SMPS as previously described having a fast start-up time over a wide input voltage range. This object is accomplished with a switch mode power supply according to claim 1. The subclaims relate to preferred embodiments.

According to the invention, the switch mode power supply comprises a network which provides in case of a high input voltage a start-up with a low oscillation frequency only for the start-up time. After start-up, the oscillation frequency changes to the normal oscillating frequency. In case of a low input voltage, the network provides a start-up with essentially the normal oscillation frequency. This can be done without safety risk for the switching transistor because the operating voltages are low in this case. Even if a slight current build-up phenomenon occurs during start-up, the switching transistor stays in the safe operating area because of the low voltages. The network, therefore, includes means which change the oscillating frequency only in case of a high mains input voltage. No soft start is provided in case of a low mains input voltage. The frequency control of the oscillation frequency can be done advantageously by frequency control means including a transistor stage which change in case of a high mains input voltage the time constant of the oscillator network which determines the oscillation frequency.

In a special embodiment the network comprises a transistor used in inverse mode as a switching element. With this circuit arrangement an additional diode is not necessary. This utilizes the fact that the maximum collector base breakdown's voltage is distinctly higher than the maximum emitter base breakdown's voltage. The SMPS can be used especially for a TV receiver which works in a mains input voltage range of 90 V to 270 V, in a TV receiver the start-up time of the picture tube has to be considered additionally.

Further details and advantages of the invention will be explained by means of a preferred embodiment with according drawings and a table which show:

BRIEF DESCRIPTION OF THE DRAWINGS AND TABLE

FIG. 1 a block diagram of a switch mode power supply according to state of the art, FIG. 2 a block diagram of a switch mode power supply according to the invention, FIG. 3 an equivalent circuit of a transistor stage for modifying the oscillation frequency during start-up.

Table 1: Exemplary values for describing the start-up behavior of the SMPS.

DESCRIPTION OF A PREFERRED EMBODIMENT

Figure 1:
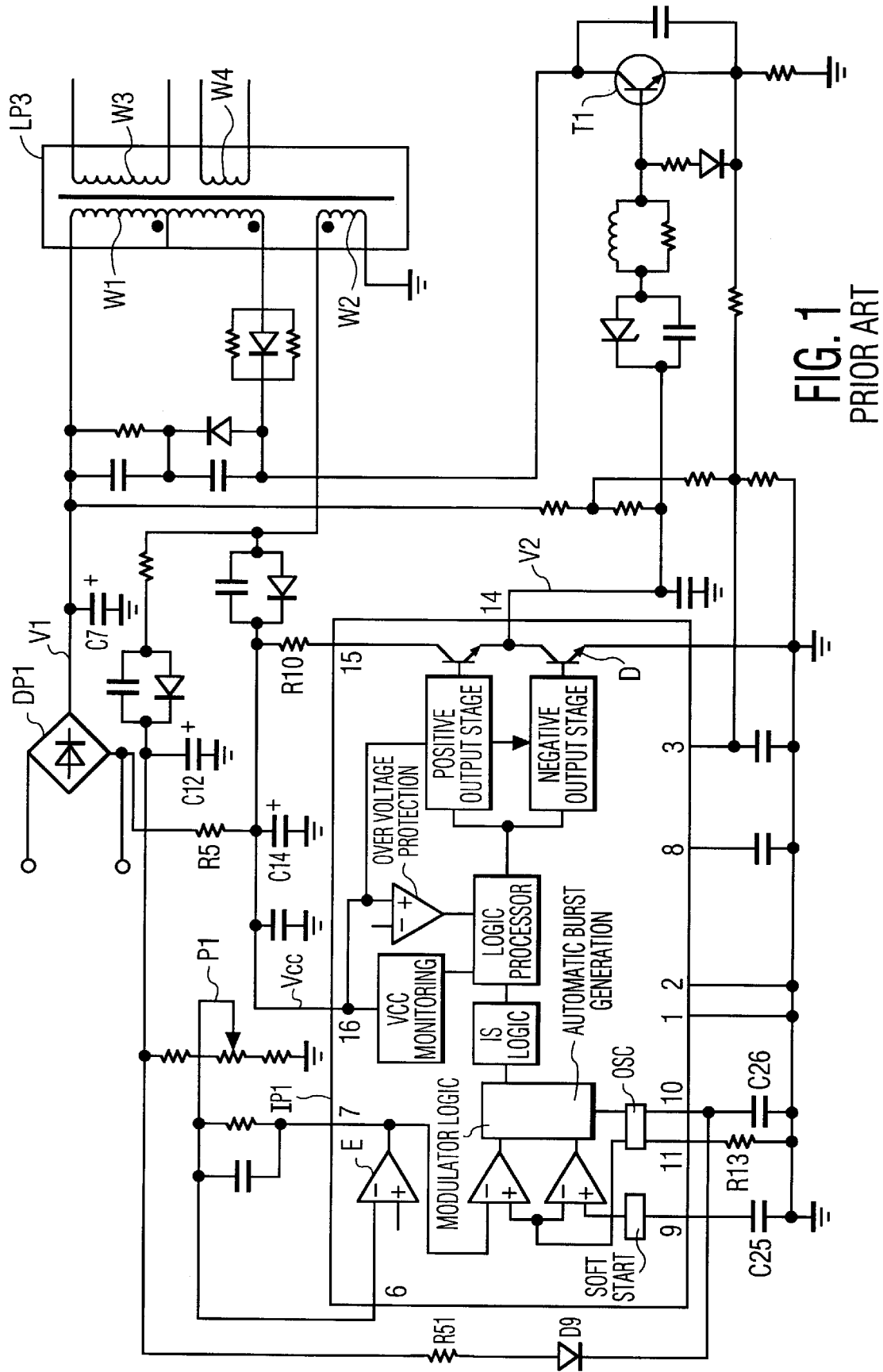
Figure 2:
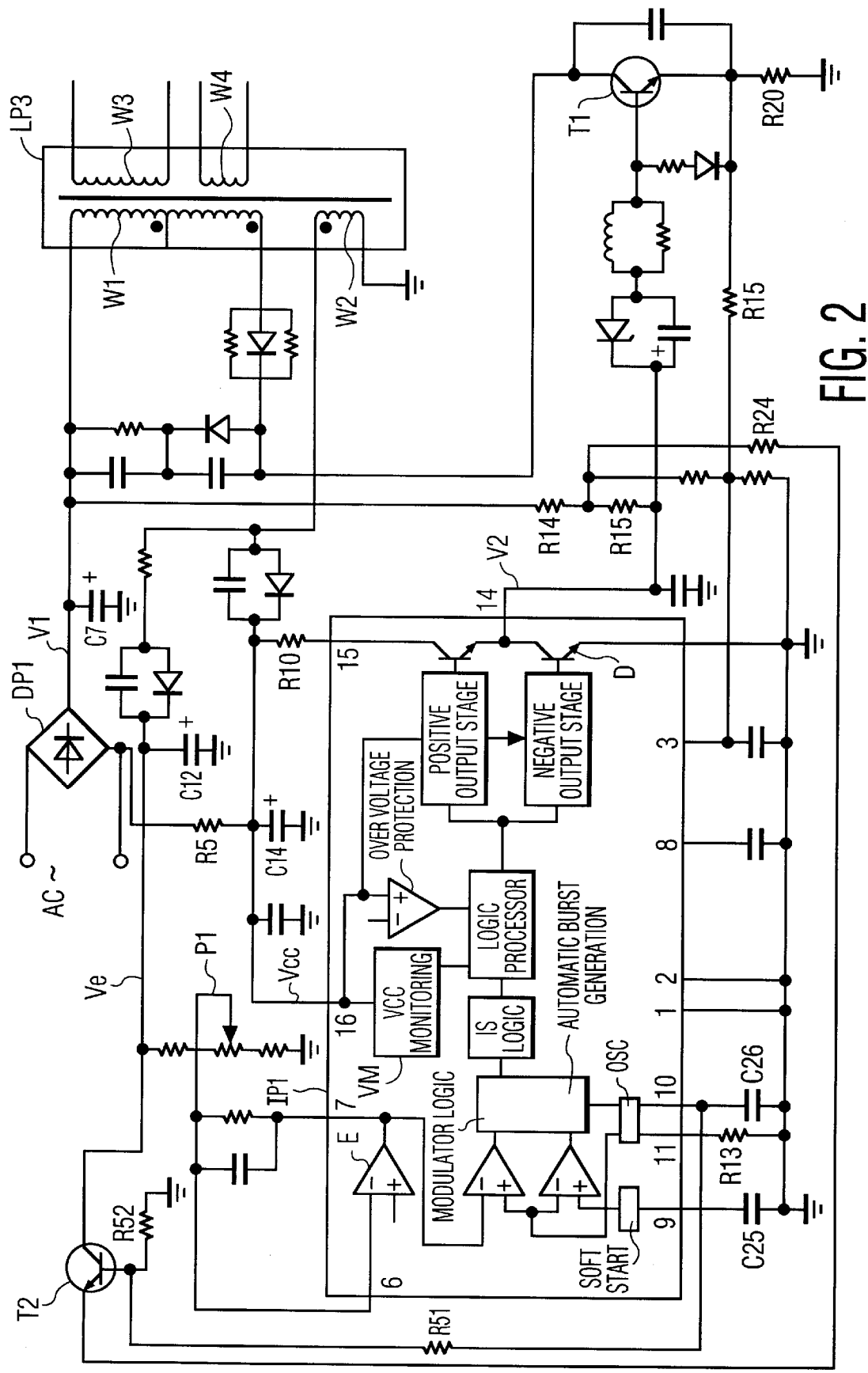

FIG. 2 shows a preferred embodiment of a switch mode power supply (SMPS) with a mains input voltage AC, a bridge rectifier DP1 and a smoothing capacitor C7 for producing a rectified voltage V1. Said voltage V1 is applied to a series connection of a primary winding W1 of a transformer LP3, a switching transistor T1 and a low resistance resistor R20. The pulse width modulated signal V2 (PW 11) for driving the switching transistor T1 is generated by an integrated circuit IP1, e.g. TEA 2261 of SGS-Thomson. Said integrated circuit IP1 includes an error amplifier E for stabilizing a secondary voltage of the transformer LPO3, an oscillator OS for generating the oscillation frequency of the PWM signal, a driver stage D for the PWM output signal and a voltage monitor VM for monitoring the supply voltage VCC. The oscillation frequency of the oscillator OS can be defined via pins 10 and 11. The transformer LP3 includes secondary windings W3 and W4 for generating secondary voltages and a feedback winding W2 for generating the supply voltage VCC and an error signal VE. Said error signal VE is applied to the error amplifier E of the integrated circuit IP1 via a potentiometer P1 which allows adjusting of the secondary output voltages.

The SMPS works as follows: In normal mode the feedback winding W2 generates the supply voltage VCC and the necessary voltage for the driver stage D via a low value resistor R10 and pin 15 of integrated circuit IP1. The duty cycle of the PWM signal V2 is controlled according to the error signal VE.

In the start-up phase after switching-on the mains input voltage AC, the integrated circuit IP1 needs an additional supply voltage to start-up because switching transistor T1 is not working in the first moment and capacitor C14 is discharged. To charge capacitor C14 an additional resistor R5 is applied between said capacitor and the mains input voltage AC. The values of capacitor C14 and resistor R5 have to be carefully chosen because capacitor C14 needs a rather high value to provide a well-stabilized supply voltage VCC during all operating conditions and resistor R5 must have a rather high resistance value to keep the power loss at a reasonable low value. The charging of the capacitor C14 therefore determines the start-up time of the integrated circuit IP1 which leads to a quite long start-up time in case of a low mains input voltage of 90 Volt. The value of capacitor C14 can be reduced advantageously to a value which is still sufficient for a stable operation of integrated circuit IP1. This value has a major inapt on the start-up time.

After starting of the integrated circuit IP1, transistor T1 is switched on and off with the duty cycle (turn on time/period of switching) ramp up according to the soft start operation of the integrated circuit IP1. Due to the fix ramp up of the duty cycle, the transistor T1 current envelope ramp up will depend on voltage V1 which is dependent on the mains input voltage (current through T1=V1* turn on time/inductance of W1). With a high switching frequency, the dischargement of the energy of winding W1 during the time the transistor T1 is off is shorter, and if the energy is not fully discharged to the load of the windings W3, W4, W2, it will flyback to the winding W1 when the transistor T1 is on and will cause that the current of transistor T1 initially is high and the energy is fully discharged to the transistor T1 during switch on. At high mains voltage input, the flyback current is much higher than expected if the switching frequency is not lowered down, and the recursive current buildup effect for the transistor T1 is too large, it will exceed the safe operating area for T1. At low mains voltage (<150V%), the current envelope is smaller (with the same turn on time, due to voltage V1 is smaller, the current through transistor T1 is smaller), so the energy discharge to secondary windings W3, W4, W2 is more complete and the flyback energy to the transistor T1 when T1 is on is smaller, so the transistor T1 can be switched at a high frequency in order to charge up capacitor C14 in time to prevent the C14 voltage drop and a stop operation of integrated circuit IP1.

At higher mains input voltages above 150 Volts, the oscillation frequency has to be reduced during start-up but will still lead to a fast start-up time because of the higher voltage. The SMPS, therefore, comprises a network for controlling the oscillation frequency of the PWM signal in dependence of the mains input voltage AC. The network provides a threshold below which the SMPS starts with essentially the normal operating frequency.

The oscillation frequency of the oscillator OS of the integrated circuit IP1 can be determined via pins 10 and 11 as already described. Therefore, a transistor stage including a transistor T2 and resistors R52, R51 and R24 is connected between capacitor C12 and capacitor C26. The resistor R13 and capacitor C26 provide the high oscillation frequency in normal mode. For high mains input voltages AC, transistor T2 is turned on via resistor R24 and a current flows from capacitor C26 via resistor R51 and the transistor T2 to capacitor C12 reducing the oscillation frequency, in the start-up phase as long as capacitor C12 is discharged, After a certain time, when the capacitor C12 is charged up of the SMPS, transistor T2 will turn off. The threshold of 150 Volts is determined by resistors R24 and R52. The base voltage of transistor T2 is immediately available via resistors R24 and R14 after switching on the SMPS.

The transistor T2 is operating as an inverse transistor which means that the collector acts as emitter and vice versa. This is possible, because a transistor can be understood as being built up of two complementary diodes. The flow of current in reverse direction in a transistor is generally a phenomenon without danger providing that the power generated in the transistor remains comparatively small. The drawback that the reverse current gain of the transistor is much less than the gain in forward mode is in this application not relevant because transistor T2 is used only as a switch. The advantage of using the inverse transistor mode is that an additional diode between transistor T2 and capacitor C12 can be saved. This is because the maximum collector bass voltage $V_{CBO}$ is distinctly higher than the maximum emitter base voltage $V_{EBO}$. As such there is no need for a diode to protect transistor T2.

Figure 3:
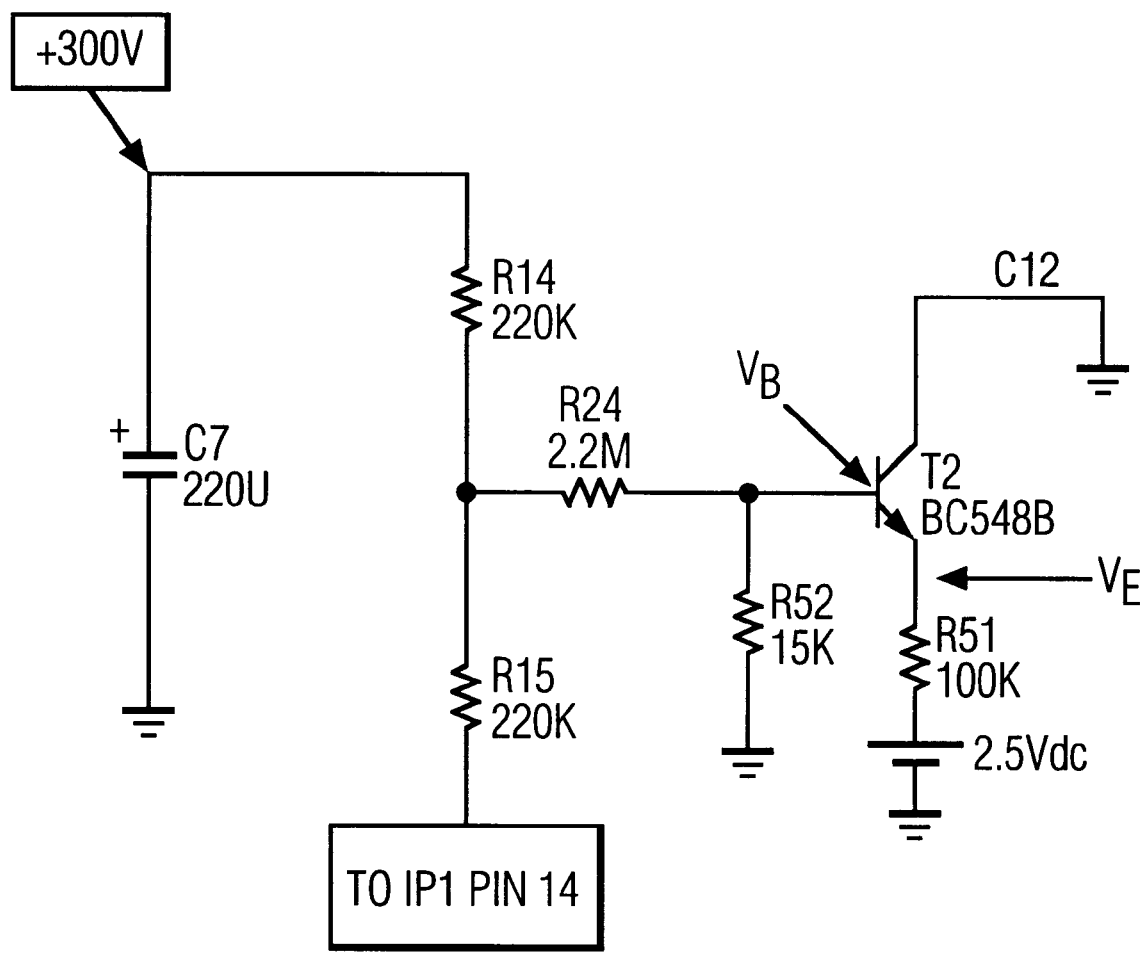

In FIG. 3 the equivalent circuit for the transistor stage T2 is shown during start-up. The collector of T2 is connected to ground effectively because there is no charge across C12 after switching on the SMPS. A 2.5 Volt DC voltage is provided at pin 10 of integrated circuit IP1. The voltage divider R24 and R51 is carefully tuned in such a way that transistor T2 will turn on only for mains input voltages of 150 Volts AC and above.

The resulting voltages for switching transistor T21, base voltage $V_B$ and emitter voltages $V_E$ are shown in table 1 for mains input voltages AC from 90 Volt up to 265 Volts. The oscillation frequency in normal mode after start-up is 22 kHz. Additionally, the corresponding start-up frequencies are shown. The start-up frequency for voltages of 150 Volts and above is greatly reduced.

The invention is not restricted to this embodiment, but can be used for all switch mode power supplies according to claim 1 which need a last start-up time over a wide mains input voltage range.

Relevant component values of the switch mode power supply shown in FIG. 2:

| R5: | 27K/3W | C7: | 220µ |
|---|---|---|---|
| R6: | 56R | C12: | 4µ7 |
| R7: | 4K75 | C14: | 470µ |
| R8: | 1KO | C25: | 100µ |
| R10: | 18R/3W | C26: | 680p |
| R11: | 100K | T1: | BUL310XI |
| R13: | 82K | T2: | BC548B |
| R14: | 220K | IP1: | TEA2261 |
| R15: | 220K | | |
| R19: | 2K2 | | |
| R20: | 0,15R | | |
| R22: | 2M2 | | |
| R24: | 2M2 | | |

We claim:

1. Switch mode power supply (SMPS) comprising control means (IP1) including an oscillator (OS) for generating a pulse-width modulated signal (V2);

characterized in the SMPS includes a network which provides in case of a high mains input voltage (AC) a start-up with a low oscillation frequency which changes after a certain time to the normal oscillation frequency and in case of a low mains input voltage (AC) a start-up with essentially the normal oscillation frequency.

2. SMPS according to claim 1, characterized in that the network comprises frequency control means which change in case of a high mains input voltage (AC) the time constant of the oscillator network determining the oscillation frequency.

3. SMPS according to claim 2, characterized in that the frequency control means comprise a switch which load the oscillator network via a capacitor above a certain mains voltage value (AC).

4. SMPS according to claim 3, characterized in that the oscillator network comprises a threshold of about 150 V and that for a mains supply voltage above said threshold a soft-start is provided and that below said threshold a soft-start essentially avoided.

5. SMPS according to claim 3, characterized in that the switch is a transistor used in inverse mode.

6. SMPS according to claim 1, characterized in that the network includes additional means comprising a low capacitance value for a fast start-up in case of a low input voltage.

* * * * *